US006928438B2

(12) United States Patent
Daray et al.

(10) Patent No.: US 6,928,438 B2
(45) Date of Patent: Aug. 9, 2005

(54) CULTURALLY CORRECT ORDERING OF KEYED RECORDS

(75) Inventors: Edward Henry Daray, Saratoga, CA (US); William B. Nettles, San Jose, CA (US); Daniel A. Rose, Markham (CA); Baldev S. Soor, Markham (CA)

(73) Assignee: International Business Machines Corporation, Armonk, NY (US)

( * ) Notice: Subject to any disclaimer, the term of this patent is extended or adjusted under 35 U.S.C. 154(b) by 539 days.

(21) Appl. No.: 09/998,269

(22) Filed: Nov. 30, 2001

(65) Prior Publication Data

US 2002/0174100 A1 Nov. 21, 2002

(30) Foreign Application Priority Data

May 18, 2001 (CA) .............................................. 2348239

(51) Int. Cl.$^7$ .............................................. G06F 17/30
(52) U.S. Cl. ................................. 707/7; 707/3; 707/10; 704/8; 715/536
(58) Field of Search ....................... 707/7, 6, 10; 704/8; 715/536

(56) References Cited

U.S. PATENT DOCUMENTS

| | | | |
|---|---|---|---|
| 4,595,980 A | 6/1986 | Innes ......................... 364/419 |
| 5,070,456 A | 12/1991 | Garneau et al. ............. 364/419 |
| 5,072,386 A | 12/1991 | Garneau et al. ............. 364/419 |
| 5,077,669 A | 12/1991 | Garneau et al. ............. 364/419 |
| 5,195,034 A | 3/1993 | Garneau et al. ............. 364/419 |
| 5,198,978 A | 3/1993 | Garneau et al. ............. 364/419 |
| 5,231,581 A | 7/1993 | Garneau et al. ............. 364/419 |
| 5,440,482 A | * 8/1995 | Davis ........................... 707/6 |
| 5,551,055 A | 8/1996 | Matheny et al. ............. 395/882 |
| 5,613,122 A | * 3/1997 | Burnard et al. ................ 713/1 |
| 5,664,206 A | * 9/1997 | Murow et al. .................. 704/8 |
| 5,675,818 A | 10/1997 | Kennedy ..................... 395/758 |
| 5,687,366 A | * 11/1997 | Harvey et al. ................ 707/10 |
| 5,734,597 A | 3/1998 | Molnar et al. ......... 364/705.08 |
| 5,787,452 A | 7/1998 | McKenna ................... 707/536 |
| 5,835,768 A | 11/1998 | Miller et al. ................ 395/682 |
| 5,873,111 A | * 2/1999 | Edberg .......................... 704/8 |
| 5,900,871 A | 5/1999 | Atkin et al. ................ 345/334 |
| 5,903,780 A | * 5/1999 | Fushimi ....................... 712/300 |
| 5,907,326 A | 5/1999 | Atkin et al. ................ 345/334 |
| 6,138,086 A | 10/2000 | Rose et al. ..................... 704/8 |
| 6,389,386 B1 | * 5/2002 | Hetherington et al. ......... 704/8 |
| 6,496,793 B1 | * 12/2002 | Veditz et al. ................... 704/8 |
| 6,738,769 B2 | * 5/2004 | Sharp ............................ 707/7 |
| 6,751,799 B2 | * 6/2004 | Kays et al. ................ 719/330 |
| 2002/0091691 A1 | * 7/2002 | Sharp ............................ 707/7 |
| 2003/0179225 A1 | * 9/2003 | Nettles et al. ............... 345/703 |

* cited by examiner

Primary Examiner—Jean M. Corrielus
Assistant Examiner—Chongshan Chen
(74) Attorney, Agent, or Firm—John L. Rogitz

(57) ABSTRACT

The invention relates to culturally sensitive sorting of records. The invention provides a method and a computer system for sorting a set of keyed records based on a preferred locale specification having collation information of a culture. The method is performed on a computer system operatively coupled to a computer readable memory storing the set of keyed records. The steps include reading a locale token associated with the set of records, the locale token identifying a preferred locale object having collation information, using the preferred locale object to locate and read the collation information, creating a culturally correct collation key for each data key associated with the each record, and using the created culturally correct collation keys to sort the set of records into a culturally correct sorted order.

27 Claims, 3 Drawing Sheets

CULTURALLY CORRECT ORDERING OF KEYED RECORDS

RELATED APPLICATIONS

The present application claims priority from Canadian patent application serial no. 2,348,239, filed May 18, 2001.

1. Field of the Invention

This invention relates to the use of programmable computer systems for sorting computer readable keyed records in general, and more specifically to culturally correct sorting of computer readable keyed records stored in a computer readable memory.

2. Background of the Present Invention

It is known that computer systems can be programmed to perform sort functions on data files or records. A set of keyed records has a characteristic or feature that can be relied upon for ordering or sequencing the records. A key is a set of alphabetic, numeric or alphanumeric characters used to locate or identify a record, but not necessarily attached to the record. A sort routine is used for sorting a set of keyed records into a preferred sequence or order that is desired by a user. A set of keyed records can be sorted or ordered in many desirable or predetermined sequences, such as an alphabetically ascending manner starting from 'A' and ending up with 'Z'. Records are sorted according to a key field. For example, family names contained in a telephone directory can be sorted alphabetically in which the key field—on which the sorting is based—is preferably the family name. Another set of ordered records could be records contained in a street directory, in which a key field can be the street name and the street number of each house. If the streets are sorted alphabetically and the houses are sorted numerically, then it can be said that two key fields (i.e., street name and house number) are being used for sorting the records of the street directory.

Various cultures have preferences for specific types of sorting criteria in which a set of keyed records should be sorted in a culturally correct manner for a specific culture. For example, citizens of the United States culturally prefer to have their records sequenced or ordered so that the culturally correct sorted records are listed as "A, a, B, b, C, c" and so on. However, citizens of Canada culturally prefer records sequenced so that the culturally correct sorted records are listed as "a, A, b, B, c, C" and so on. Therefore, it is appreciated that culturally correct sorting rules can vary from culture to culture.

Coded character sets are used for converting binary data contained in records, including key fields, into alpha-numerical information for presentation to users. A coded character set provides for the assignment of a unique binary value to each corresponding element of a graphic character set. These graphic character sets are the abstract symbols used in written languages. There are many well known examples of various types of coded character sets used for converting human readable alphanumeric characters (i.e., abstract symbols) into a form to be processed by a computer, such as ASCII (American Standard Code for Information Interchange), BCD (Binary Coded Decimal), and EBCDIC (Extended Binary-Coded Decimal Interchange Code). ASCII is a binary code assignment for representing English alphanumeric characters. By using the ASCII code set, each letter of the English alphabet is assigned a decimal number from 0 to 127. For example, the ASCII code for uppercase M is 77.

Computer programs designed to sort records typically do so based on representative binary numbers (i.e., a machine representation) of the human readable alphanumeric characters contained in the records. Computer programs do not work with the human readable alphanumeric characters, such programs only process the machine representations. A programmed computer processor can generate a sorted list of records based on binary representations of the characters contained in a key field of each record. However, the resulting sorted set of keyed records may not be sequenced in a manner that is culturally sensitive. The resulting sorted set of keyed records sequenced in a manner according to the binary representations of a key field in each record, may not be culturally correct because the binary assignment of values typically does not take cultural preferences into account. This is wholly inadequate for culturally preferred sorting of records.

Implementations of indexed data in flat file systems or hierarchical databases do not provide culturally correct data key fields. Typically, in those situations, the data is created using a coded graphic character set in which binary values were assigned to characters without regard to cultural preference. The resultant sort order may thus appear to be somewhat random at best, inconsistent across coded graphic character sets, and insufficient in meeting user expectations. In these implementations, the collation information is unknown (at best restricted to the order of the implemented binary assignments) which can and does vary, the character encoding information is unknown, and the character size of the characters used in the data key fields is presumed to be a predetermined number or grouping of bits, such as 8 bits.

Low-level system components, such as access methods within file systems are performance sensitive. These components cannot tolerate extended path length searches to resolve long, variable-length character strings that may provide information about the cultural preference of the user. Historically, data management services were created prior to the advent of requirements for culturally correct ordering. Binary representation of the character codes themselves was presumed sufficient as sorting values. There were not as many coding schemes for data, nor was such a wide variety of cultural preferences acknowledged. Therefore, cultural preferences (locales) and character encoding information (i.e., coded character sets) were ignored.

For example, data management services are built upon platform specific data encoding assumptions typically using an 8-bit character code. While the 8-bit character code may have numerous variations on a platform, the data management services supported only one instance of the 8-bit character code; thus, data management services ignore other variations of the 8-bit character code and pertinent cultural information. The data management service responsible for key field creation has knowledge of only the key field location, its length and the data length and no information regarding the user cultural preference. Without the required meta data (i.e., data that describes other data, such as the case with cultural preference information), culturally based ordering of the keys cannot be done and the user is left with whatever ordering the binary representation of the character set provided.

Data encoding format changes are inevitable as computing platforms struggle to accommodate new schemes such as Unicode. The format changes alter assumptions about the underlying encoding of the data, which is a technical or structural issue, and do not provide any direct information regarding collation specifications, which is a cultural issue.

U.S. Pat. No. 5,675,818 System and Methods for Improved Sorting with National Language Support by R. D.

Kennedy (7, Oct. 1997) d records by examining rules for expanding characters, such as 'AE' that is commonly used in the German language, in various ways. This patent teaches methods for locale specific sorting of textual data, character expansion, and relative weights of such characters.

U.S. Pat. No 5,072,386 Method for Culturally Predictable Keysort within a National Language Support (NLS) Data Processing System by D. Garneau et al (10 Dec. 1991) discloses a method for assigning, to a sortable key, an alphanumeric key value, a diacritic key value, a case key value, and a special character key value. The various key values are ordered in a culturally predictable manner, so that subsequent sorts of the keys will result in a predictable sort order. This patent teaches a method for collating textual elements using four categories of keys (weights).

U.S. Pat. No. 5,070,456 Method for Facilitating the Sorting of National Language Keys in a Data Processing System by D. Garneau (3 Dec. 1991) discloses a method for assigning, to a sortable key, an alphanumeric key value, a diacritic key value, a case key value, and a special character key value. The various key values are ordered in a culturally predictable manner. After building the keys values for each key, a place value may be assigned to each unique character which is based upon these four values. This patent teaches a method for creating place value assignments for sortable keys to perform culturally correct ordering.

U.S. Pat. No. 6,138,086 Encoding of Language, Country and Character Formats for Multiple Language Display and Transmission by B. Soor et al discloses a computer system for transmitting and displaying files containing variable locale selectors such as language, territory, and coded character set identifiers. The code contains information defining the language and the territory. Locale tokens are described.

Generally, the prior art uses cultural profiles to build enhanced collation keys but it does not teach or provide a mechanism for identifying a preferred collation specification and coded character data information to be used by performance sensitive system components to meet the user requirements for culturally correct collation, especially with respect to keyed data.

SUMMARY OF THE PRESENT INVENTION

The present invention provides a programmed computer system, a method, and a computer program product for culturally correct sorting of computer readable data records so that users can view the sorted output records in accordance with their cultural expectations. The invention provides a method for creating culturally corrected data keys by using meta data (i.e., data describing data) for describing the data contained in the records, such as a coded character set, and a preferred order of by way of a collation specification.

Advantageously, the present invention provides a mechanism for identifying a preferred cultural sorting of keyed computer-readable data records (i.e., structured data as opposed to unstructured data, such as video files) in a culturally correct manner. A locale token is just the short hand identifier, a digital name. The locale token may provide direct or indirect addressability to the locale object. A locale includes a combination of factors for localization preferences needed to localize a software application program for a particular market, such as a character set for encoding characters in that locale, a language that controls linguistic manipulation of character strings (e.g., stemming and tokenization rules), and a dialect/region that define regional customs and conventions that vary within the language (e.g., capitalizing characters follows different rules in Canadian-French than in France-French).

For example, there can be a locale specification for U.S. English and another locale specification for Canadian English. A locale specification is a collection of cultural data and functions specific to a geographic area of the world, such as character classification, collating or sorting rules, monetary formatting, numeric formatting, and date and time formatting. A locale token can be stored separately from the data records, and then later can be clipped (i.e., appended to the data records) or logically associated with the data records.

In a first aspect of the present invention, there is provided 1. A method performed on a computer system operationally coupled to computer readable memory for storing a set of records each having a data key, the method for sorting, based on collation information of a particular culture pertaining to the set of records, including the steps of reading a locale token associated with the set of records, the locale token identifying a preferred locale object having collation information, using the preferred locale object to locate and read the collation information, creating a culturally correct collation key for each data key associated with each record, and using the created culturally correct collation keys to sort the set of records into a culturally correct sorted order.

In a second aspect of the invention, there is provided a computer program product for use in a computer system operatively coupled to a computer readable memory, the computer program product including a computer-readable data storage medium tangibly embodying computer readable program code for directing the computer to sort a set of records each having a data key based on collation information of a particular culture pertaining to the set of records, the code including code for instructing the computer system to read a locale token associated with the set of records, the locale token identifying a preferred locale object having collation information, code for instructing the computer system to use the preferred locale object to locate and read the collation information, code for instructing the computer system to create a culturally correct collation key for each data key associated with the each record, and code for instructing the computer system to use the created culturally correct collation keys to sort the set of records into a culturally correct sorted order.

In a third aspect of the invention, there is provided a computer system operatively coupled to a computer readable memory, the computer system for sorting, based on collation information of a particular culture pertaining to the set of records, the computer system including means for reading a locale token associated with the set of records, the locale token identifying a preferred locale object having collation information, means for using the preferred locale object to locate and read the collation information, creating a culturally correct collation key for each data key associated with the each record, and means for using the created culturally correct collation keys to sort the set of records into a culturally correct sorted order.

A better understanding of these and other aspects of the invention can be obtained with reference to the following drawings and description of the preferred embodiments.

ILLUSTRATIONS OF THE PREFERRED EMBODIMENTS

The following figures are examples of the implementation of the present invention, in which.

DETAILED DESCRIPTION OF THE PREFERRED EMBODIMENTS

Figure 1:
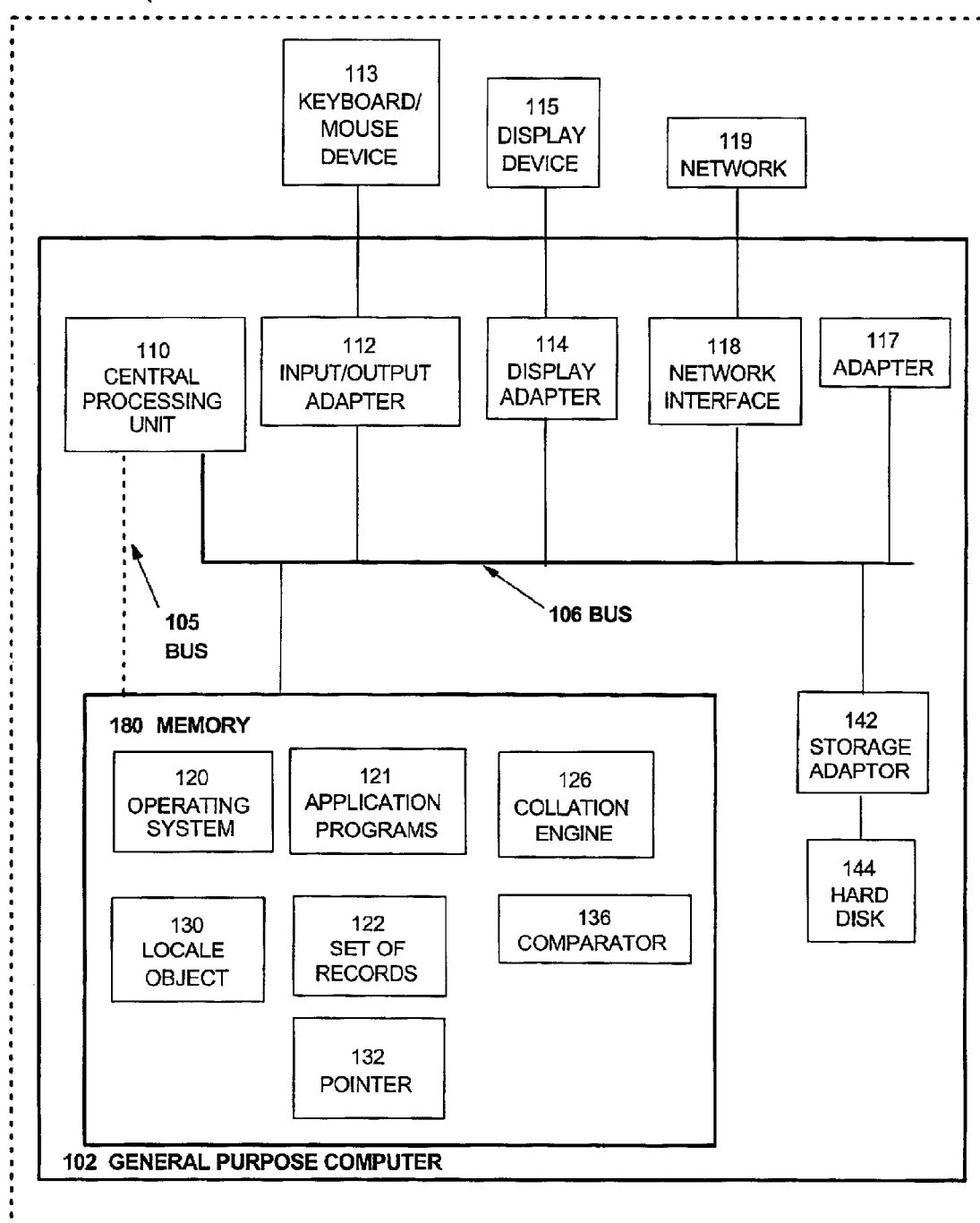
FIG. 1 depicts a system for a preferred embodiment of the present invention.

FIG. 1 depicts a simplified block diagram of computer system 100 representing one preferred embodiment for implementing the present invention. Computer 102 has a central processing unit (CPU) 110, which is a programmable processor for executing programmed instructions, such as instructions contained in application programs 121, stored in memory 180. Memory can include hard disk, tape or other media. While a single CPU is depicted in FIG. 1, it is understood that other forms of computer systems can be used to implement the invention, including multiple CPUs. It is also appreciated that the present invention can be implemented in a distributed computing environment having a plurality of computers operationally communicating via a suitable network 119, such as the Internet.

CPU 110 is operationally connected to memory 180 either through a dedicated system bus 105 and/or an open system bus 106. Memory 180 can be a random access semiconductor memory for storing both executable application programs 121 and data records, such as set of keyed records 122. Memory 180 is depicted conceptually as a single monolithic entity but it is well known that memory 180 can be arranged in a hierarchy of caches and other memory devices. FIG. 1 illustrates that operating system 120 and executable application programs 121 reside in memory 180.

Operating system 120 provides functions such as device interfaces, memory management, multiple task management, and the like as known in the art. CPU 110 can be suitably programmed to read, load, and execute instructions of operating system 120 and instructions of executable application programs 121. Computer system 102 has the necessary subsystems to implement culturally correct sorting of keyed records as will be discussed later. Application programs 121 include server software applications in which network interface 118 interacts with the server software application to enable computer 102 to function as a network server via network 119.

Bus 106 supports transfer of data, commands, and other information between various subsystems of computer system 102. While shown in simplified form as a single bus, bus 106 can be structured as multiple buses arranged in hierarchical form. Display adapter 114 supports video display device 115, which is a cathode-ray tube display or other suitable display technology. Input/output adapter 112 supports suitable input and output devices, such as keyboard and mouse devices 113, and a disk drive unit (not shown). Storage adapter 142 supports one or more data storage devices 144, which is a magnetic hard disk drive or CD ROM drive although other types of data storage devices can be used.

Adapter 117 is used for operationally connecting many types of peripheral computing devices to computer 102 via bus 106, such as printers, bus adapters, other computers using one or more protocols including Token Ring, LAN connections, as known in the art. Network interface 118 provides a physical interface to a suitable network 119, such as the Internet. Interface 118 includes a modem that can be connected to a telephone line for accessing network 119. Computer 102 can be connected to another network server via a local area network using a protocol and the network server which can in turn be connected to the Internet. FIG. 1 is intended as an exemplary simplified representation of computer 102 by which embodiments of the present invention can be implemented. It is understood that in other computer systems many variations in system configuration are possible in addition to those mentioned here. As an example, specific programmed computer systems such as iSeries™ or System 390™ computer systems, both available from IBM Corporation, would be suitable.

Also shown residing within memory 180 is a set of keyed records 122, a locale object 130, a pointer 132 for pointing to set of keyed records 122 if set of keyed records 122 resides in the memory of another computer system network connected to computer 102 via interface 118, a collation engine 126, and a comparator 136. A description of these items and their functions will be described later.

Figure 2:
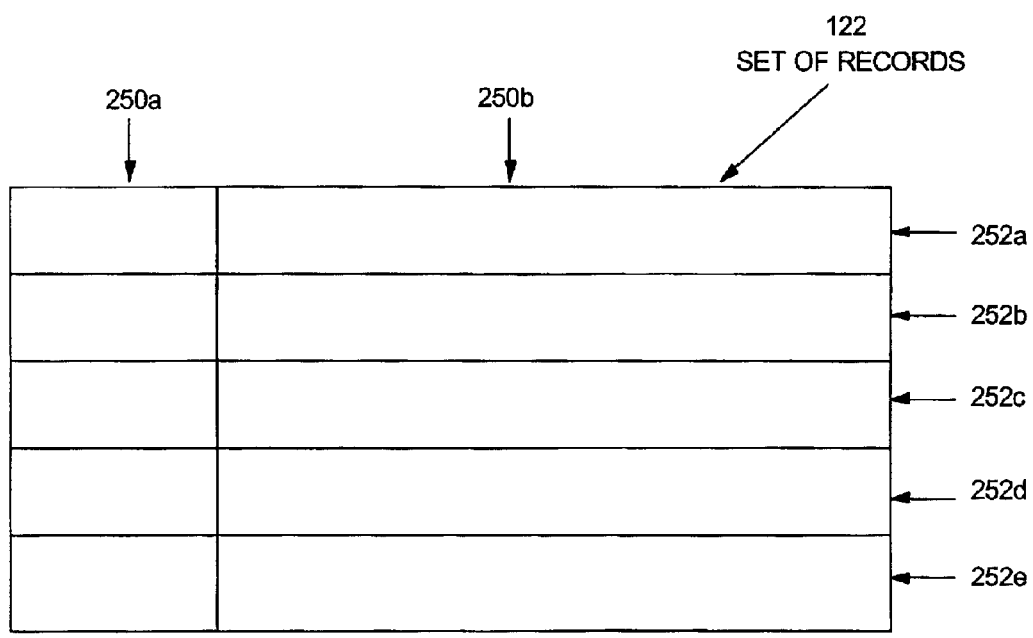
FIG. 2 depicts a set of keyed records.

FIG. 2 depicts an example of a set of keyed records 122. Records 252a, 252b, 252c, 252d, 252e each have a corresponding key field 250a and a corresponding data field 250b. Records 252a, 252b, 252c, 252d, 252e can be sorted on the key field 250a. In the absence of a key field 250a, the entire record can be used as a key field. The data field 250b includes binary coded information that can be converted into a corresponding collection of alphanumeric characters for suitable display for human usage via a preferred coded character set. It is understood that alphanumeric characters can include the world's language scripts that are readable by various cultures. Preferably, each record of the set of keyed records 122 includes at least one key field 250a and one data field 250b.

Descriptive attributes associated with a set of keyed records 122 include a file creation date, a file size, a locale token, and a coded character set used to encode the alphanumeric data. The actual locations of the descriptive attributes is not germane to the present invention. The descriptive attributes could be included as part of the set of keyed records 122, or could be included in a distinct and separate descriptive file, or could be included in a catalog of descriptive attributes in which various sets of records are associated with their corresponding descriptive attribute file. A locale token is logically associated with a set of keyed records 122. If there are a plurality of sets of records, then a locale token may be associated with each set of records or there may be a unique locale token for each record set. The locale token is an identifier for a preferred locale specification and a preferred coded character set such as ASCII, for decoding and representing the contents of a set of keyed records 122 in a preferred alpha-numerical format. Since the same encoding is used for all records of the set of keyed records 122, then the environment can be called a homogeneous environment. What is important is that existing data contained in the set of keyed records 122 is not altered, and the records are ordered/sequenced as required by a preferred locale specification.

The coded character set is an assignment of binary values to each abstract character (symbols) comprising the written script of the user's language as previously discussed. When the keys (i.e., information contained in key field 250a) have binary coded information that represents just numerical values, for example which could represent an ISBN number of a book, set of keyed records 122 can be sorted on the key filed 250a by a simple binary sort routine known to persons having ordinary skill in the art, and the method provided by the present invention need not be used. This is because there is widespread cultural agreement on how numbers are ordered across language scripts. The invention is intended to sort the data interpreted or transformed by the coded character set that represents alphanumeric character data or scripts, such as names of authors of books. The key field 250a contains keyed data that can be identified so that the process of building culturally correct collation keys can be performed. The alphanumeric character data contained in key 250a is used by the collation engine 126, to create a separate suitable culturally correct collation key to enable subsequent culturally correct collation of set of keyed records 122 by comparator 136.

A locale token can be logically associated to each set of keyed records 122. Preferably, the locale token is appended to the set of keyed records 122 for easy identification. The locale token will be used to identify a preferred locale specification that includes collation information such as rules that specify how the alphanumeric data contained in the key field 250a should be processed to create a culturally correct collation key which can then be sorted.

Set of keyed records 122 can be structured or formatted as a flat file, a dataset or a stream of data. Set of keyed records 122 can be implemented in hierarchical databases or in flat file systems. Flat file systems can be text files that can have field lengths that are either fixed or variable. Variable length fields can use commas to delimit each field, and fixed length fields can use fixed bit widths to delimit each field, as is well known.

Set of keyed records 122 can be in the form of a table having rows of records 252a, 252b, 252c, 252d, 252e depicting each record, and having columns 250a, 250b representing fields for records 252a, 252b, 252c, 252d, 252e. Each record includes a key field 250a and at least one data field 250b. For example, key field 250a could represent a name of an author, and data field 250b could represent a title of a book associated with the name of an author. Additional data fields can be included with a particular record of set of keyed records 122 for including other aspects related to the record. For example, additional data fields could include other data relating to the book such as an ISBN number, date of publication, and the like.

Key field 250a includes binary coded information used for locating or identifying a record. It is appreciated that the key field 250a of a record does not necessarily have to be appended to or attached to the record. The invention provides a method for culturally correct sorting of records 252a, 252b, 252c, 252d, 252e (each having binary encoded information that represents graphic characters readable by a user) by converting, via a collation engine 126, the key data contained in key field 250a into culturally correct collation keys and sorting the culturally correct collation keys via a comparator 136 in accordance with the cultural preference specified in the locale object. As will be described later, the present invention can be used to sequence or order records in a culturally correct manner. For example, use of the invention can place the names of the authors in alphabetic sequence in accordance with a cultural preference specified in a locale object.

Preferably, set of keyed records 122 resides in memory 180 of programmed computer 102. Alternatively, set of keyed records 122 can reside in the memory of another computer system that can be operatively connected to computer 102 via network interface 118 and network 119 as shown in FIG. 1. A pointer 132 (FIG. 1) may be used which is an address for pointing to a location of the set of keyed records 122, which can be loadable and readable to and from memory 180, or can be remotely loadable from a computer operationally networked with computer 102.

The use of collation rules and weights are well known in the art. For more details about rules and weights, reference may be made to National *Language Design Guide, Volume 2* of the *National Language Support Reference Manual, 4th* Edition 1994, published by IBM Canada Ltd. (document number SE09-8007-03).

An example of a locale specification is defined in ISO/IEC 9945-1:1900 (IEEE Standard 1003.2-1990) Information Technology-Portable Operating System Interface (POSIX™) Shell Utilities. IEEE Standards 1003.2 and 1003.2a are based on a 'locale' model which provides the binding methodology for combining user preferences for culture, language and conventions with the functions of an internationalized application program at run-time. A locale specification includes a collation sequence definition for defining the preferred cultural order for alphanumeric characters. The cultural order is expressed in terms of collation weights by assigning to each collation element one or more collation weights. This does not imply that implementations assign such values, but that ordering of strings using the resultant collation definition will behave as if such assignment is done and used in the collation process. Collation rules can specify how to order or sequence data in a manner acceptable for a specific culture.

Locale object 130 is an object containing a collation information. A locale object 130 is typically logically associated with a set of keyed records 122. If a plurality of locale objects is used, each locale object may be associated with each set of keyed records, each locale object may be associated with more than one set of keyed records or more than one set of keyed records may be associated with a locale object. Optionally, a data catalog can be used to associate a set of keyed records 122 with a locale object 130.

Figure 3:
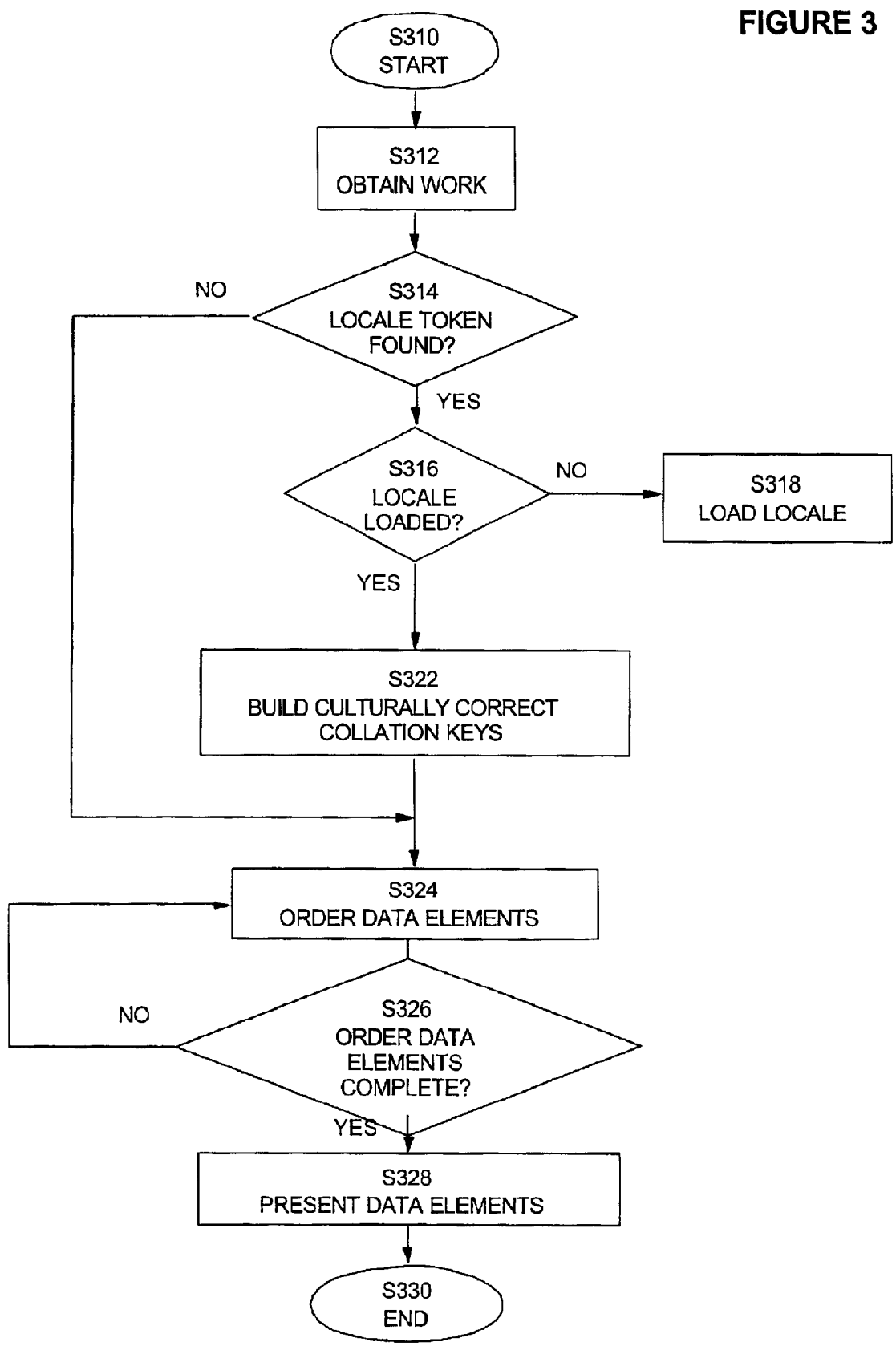
FIG. 3 depicts a flowchart for collating the set of keyed records.

FIG. 3 depicts a flow chart of the steps for collating a set of keyed records 122 of FIG. 2 and representing a preferred method of the present invention. Characterizations of sets of records has been previously described, referring to FIGS. 1 and 2. The preferred method sorts, based on a preferred locale specification having collation information of a culture, a set of records wherein each record includes a key field. The method is performed on a computer system operatively coupled to a computer readable memory storing the set of records.

In step S310, computer system 102 (FIG. 1) reads a request to sort records, for example records 252a, 252b, 252c, 252d, 252e of set of keyed records 122 (FIG. 2). For the purposes of this description, sorting is a process of sequencing or ordering records 252a, 252b, 252c, 252d, 252e into a culturally desired sequence. A locale specification specifies the desired sorting requirements. A locale object 130 provides addressability to the run time instance of the collation specifications unique to a particular culture. The method includes the step of reading a locale token associated with the set of keyed records 122, the locale token identifying a preferred locale object having collation information, and using the preferred locale object to locate and read the collation information.

In step S312, computer system 102 determines the location of a set of keyed records 122 by reading a set pointer 132 (FIG. 1), which is a pointer that determines the location in memory of a set of keyed records 122. Computer 102 reads key fields 250a of the set of keyed records 122. Also, computer 102 determines the location of a locale object by reading a locale token logically associated with a set of records. The location of the locale object can be determined by system routines using the locale token either directly by reference or indirectly through table lookup. At a later step, a collation engine 126 subsequently reads key data from the key field 250a and the collation information to build a set of culturally correct collation keys so that the culturally correct sorting of records 252*a*, 252*b*, 252*c*, 252*d*, 252*e* can be performed. Preferably, collation engine 126 is a computer program application that is known to persons having ordinary skill in the art for creating collation keys.

In step S314, computer 102 determines whether set of keyed records 122 has an associated locale token. If computer 102 locates the associated locale token, then processing continues to step S316 where the locale object availability is determined. When the locale object is available its collation specifications are used and set of keyed records 122 will be subsequently ordered in a culturally sensitive manner according to the created culturally corrected collation keys, as subsequently described. If computer 102 does not find the associated locale token in step S314, then processing continues to step S324. In step S324, set of keyed records 122 is sorted using the key field 250*a* in which the records 252*a*, 252*b*, 252*c*, 252*d*, 252*e* may not be sorted in a culturally sensitive manner, but rather will be sorted based on the binary representations present in the key field 250*a*.

In step S316, computer 102 determines if the associated locale object 130 is available for use. If locale object 130 has been loaded to memory 180, then processing continues to step S322. If locale object 130 has not been loaded to memory 180, then processing continues to step S318. In step S318, computer 102 loads the associated locale object 130 into memory 180.

In step S322, collation engine 126 builds culturally correct collation keys that will be used for culturally correct sorting of record 252*a*, 252*b*, 252*c*, 252*d*, 252*e* of set of keyed records 122. The method includes the step of creating a culturally correct collation key for each data key in key field 250*a* associated with the each record.

Step S322 is an iterative process that inputs the selected locale specification having collation information. Building the culturally correct collation keys is a process that is well known to persons having ordinary skill in the art of locales and locale specific collation. Many known methods exist for building collation keys, as detailed, for example, in U.S. Pat. No. 5,072,386 and U.S. Pat. No, 5,31,581 both titled Method for Culturally Predictable Keysort within a National Language Suport (NLS) Data Processing System by Garneau et al.

In step S324, computer 102 uses comparator 136 to sort records 252*a*, 252*b*, 252*c*, 252*d*, 252*e* of the set of keyed records 122 based on culturally correct collation keys created from step S322 or based on culturally corrected collation keys previously created from step S322 (e.g., keys that were created and then stored for later use or reuse). The method includes the step of using the created culturally correct collation keys to sort the set of records 122 into a culturally correct sorted order. The comparator 136 uses known binary compare operations to sequence the collation keys of the set of records 122. Comparator 136 is a computer program application that is well known in the art. Comparator 136 resides in memory 180 as an application program or it can be a hardware module operatively connected with CPU 110. If the culturally correct collation keys were not previously identified or created, then comparator 136 will sort the key field 250*a* and the resultant sorted records 252*a*, 252*b*, 252*c*, 252*d*, 252*e* may not sort in a culturally correct manner.

In step S326, computer 102 determines whether records 252*a*, 252*b*, 252*c*, 252*d*, 252*e* have all been collated. If there are any unsorted records yet to be sorted, then processing continues to step S324 and the next unsorted record is selected for subsequent culturally correct sorting with the previously sorted records of the set of records 122. If there are no more unsorted records to be sorted, then processing continues to step S328.

In step S328, computer 102 has completed culturally correct sorting of records 252*a*, 252*b*, 252*c*, 252*d*, 252*e*. The collated records are presented to a user via a computer readable file being stored on a computer readable medium such as a hard disk. Alternatively, the results can be printed via a hard copy device, such as a printer, or can be displayed via display device 115, or can be transmitted to another computer system over network 119. In step S330, computer 102 ends the process.

The concepts of the present invention can be further extended to a variety of other applications that are clearly within the scope of this invention. Having thus described the present invention with respect to a preferred embodiment as implemented, it will be apparent to those skilled in the art that many modifications and enhancements are possible to the present invention without departing from the basic concepts as described in the preferred embodiment of the present invention. Therefore, what is intended to be protected by way of letters patent should be limited only by the scope of the following claims.

What is claimed is:

1. A method performed on a computer system operationally coupled to computer readable memory for storing a set of records each having a data key, said method for sorting based on collation information of a particular culture pertaining to said set of records, comprising:

reading at least one locale token associated with the set of records, the locale token identifying at least one locale object having collation information;

using at least the locale object to locate and read the collation information;

creating at least one culturally correct collation key for at least one some data keys associated with at least some records, wherein the culturally correct collation key includes locale information and at least one collation rule for correct cultural preference of sorting; and using at least one culturally correct collation key to sort the set of records into at least one culturally correct sorted order.

2. The method of claim 1, further including operating the computer system in a distributed computing environment.

3. The method of claim 2, further including:

using a pointer to locate the set of records; and using the locale token to identify at least one coded character set.

4. The method of claim 1, wherein said set of records is structured.

5. The method of claim 4, wherein keyed records of said set of records each includes a data field.

6. The method of claim 4, wherein said locale token is appended to said set of records.

7. The method of claim 4, wherein the act of creating said culturally correct collation key is performed using at least one collation engine.

8. The method of claim 1, wherein at least one culturally correct collation key is collated using a comparator.

9. The method of claim 4, further including displaying said set of records.

10. A computer program product for use in a computer system operatively coupled to a computer readable memory, the computer program product including a computer-readable data storage medium tangibly embodying computer readable program code for directing said computer to sort a set of records each having a data key based on collation information of a particular culture pertaining to said set of records, said code comprising:

means for instructing said computer system to read a locale token associated with the set of records, the locale token identifying a preferred locale object having collation information;

means for instructing said computer system to use the preferred locale object to locate and read the collation information;

means for instructing said computer system to create a culturally correct collation key for each data key associated with the each record, wherein the culturally correct collation key includes locale information and at least one collation rule for correct cultural preference of sorting; and means for instructing said computer system to use the created culturally correct collation keys to sort the set of records into a culturally correct sorted order.

11. The computer program product of claim 10 further comprising means for instructing said computer system to operate the computer system in a distributed computer environment.

12. The computer program product of claim 11 further comprising:

means for instructing said computer system to use a pointer to locate the set of records; and means for instructing said computer system to use the locale token to identify a preferred coded character set.

13. The computer program product of claim 10 wherein said set of records is structured.

14. The computer program product of claim 13 wherein keyed records of said set of keyed records each includes a data field.

15. The computer program product of claim 13 further comprising means for instructing said computer system to append said locale token to said set of records.

16. The computer program product of claim 13 further comprising means for instructing said computer system to create said collation key using a collation engine.

17. The computer program product of claim 13 further comprising means for instructing said computer system to collate said key using a comparator.

18. The computer program product of claim 10 further comprising means for instructing said computer system to display said records.

19. A computer system operatively coupled to a computer readable memory, the computer system for sorting, based on collation information of a particular culture pertaining to said set of records, the computer system undertaking method acts comprising:

reading a locale token associated with the set of records, the locale token identifying a preferred locale object having collation information;

using the preferred locale object to locate and read the collation information;

creating a culturally correct collation key for each data key associated with the each record, wherein the culturally correct collation key includes locale information and at least one collation rule for correct cultural preference of sorting; and using the created culturally correct collation keys to sort the set of records into a culturally correct sorted order.

20. The computer system of claim 19 wherein the method acts undertaken by the computer system further include configuring said system to operate in a distributed computing environment.

21. The computer system of claim 20 wherein the method acts undertaken by the computer system further include:

using a pointer to locate the set of records; and using the locale token to identify a preferred coded character set.

22. The computer system of claim 19 wherein said set of records is structured.

23. The computer system of claim 19 wherein keyed records of said set of records each includes a data field.

24. The computer system of claim 19 wherein the method acts undertaken by the computer system further include configuring said system to append said locale token to said set of records.

25. The computer system of claim 19 wherein the method acts undertaken by the computer system further include configuring said system to create said collation key via a collation engine.

26. The computer system of claim 19 wherein the method acts undertaken by the computer system further include configuring said system to collate said collation key via a comparator.

27. The computer system of claim 19 wherein the method acts undertaken by the computer system further include configuring said system to display said records.

\* \* \* \* \*